(12) United States Patent
Christensen (10) Patent No.: US 7,361,326 B2
(45) Date of Patent: Apr. 22, 2008

(54) PROCESS FOR THE PRODUCTION OF SULFURIC ACID

(75) Inventor: Kurt Agerbæk Christensen, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 155 days.

(21) Appl. No.: 11/273,333

(22) Filed: Nov. 15, 2005

(65) Prior Publication Data
US 2007/0110663 A1    May 17, 2007

(51) Int. Cl.
  *C01B 17/74* (2006.01)
  *C01B 17/765* (2006.01)

(52) U.S. Cl. ...................... 423/522; 423/529

(58) Field of Classification Search ............... 423/522, 423/529
See application file for complete search history.

(56) References Cited

U.S. PATENT DOCUMENTS

| | | | |
|---|---|---|---|
| 4,348,373 A | 9/1982 | Schoubye | |
| 4,368,183 A | 1/1983 | Dorr et al. | |
| 4,520,003 A * | 5/1985 | Petersson et al. | 423/533 |
| 4,533,537 A * | 8/1985 | Dittmar et al. | 423/522 |
| 5,108,731 A | 4/1992 | Schoubye | |
| 5,198,206 A | 3/1993 | Schoubye | |
| 6,090,364 A | 7/2000 | Schoubye | |
| 6,153,168 A * | 11/2000 | Seitz et al. | 423/522 |
| 6,500,402 B1 * | 12/2002 | Winkler et al. | 423/522 |

* cited by examiner

*Primary Examiner*—Timothy C. Vanoy
(74) *Attorney, Agent, or Firm*—Dickstein Shapiro LLP (57) ABSTRACT

A process of producing sulfuric acid from feed gases containing 0.1-30% $SO_2$. The process produces concentrated sulfuric acid from a feed gas containing 0.1 vol % to 30 vol % $SO_2$, in particular a strong feed gas containing 6 vol % to 30 vol % $SO_2$, that enables the gas entering the final wet condensing stage to have an acid dew point of below 260° C., while at the same time achieving current requirements of acid mist emissions of about 20 ppmv without resorting to substantial air dilution of the strong feed gas.

12 Claims, 5 Drawing Sheets

PROCESS FOR THE PRODUCTION OF SULFURIC ACID

FIELD OF THE INVENTION

The present invention relates to the production of sulfuric acid from a sulfur dioxide feed gas. In particular, the invention relates to the production of sulfuric acid from wet feed gases containing $SO_2$ in concentrations of 0.1 vol % to 30 vol %, particularly 6 vol % to 30 vol % and having a molar ratio $H_2O$ to $SO_2+SO_3$ greater than one, such as exhaust gases from metallurgical operations and from the combustion of hydrogen containing fuels like spent acid from petrochemical alkylation, hydrogen sulfide, ammonium sulfate waste and fossil fuels including heavy oil residues and petroleum coke. More particularly, the invention is concerned with the improvement in the acid mist control of plants having a single wet condensation stage for the production of sulfuric acid after the $SO_2$ conversion stage and where the cooling agent in said condensation stage is a gaseous medium such as air.

BACKGROUND OF THE INVENTION

The production of sulfuric acid from exhaust gases in common industrial operations is normally conducted by a catalytic oxidation stage, where $SO_2$ is converted to $SO_3$ followed by a hydration step whereby $SO_3$ is converted to sulfuric acid vapor. The sulfuric acid is then condensed in a cooling step by indirect heat exchange with a cooling medium, normally air.

U.S. Pat. No. 5,198,206 discloses such a process, in which a gas containing $SO_3$ and an excess of water is subjected to a single wet condensation stage in order to produce condensed sulfuric acid. In this process, sulfuric acid vapors are condensed in a manner where formation of fine acid mist droplets is substantially avoided thereby facilitating the filtration of the acid mist during contact of the gas with a high-velocity filter. Small solid particles acting as nuclei on which the sulfuric acid vapor condenses are provided before the condensation begins in order to restrict the amount of acid mist emitted. This patent further discloses the use of a synthetic feed gas in an experimental setup containing a glass tube for condensing sulfuric acid, where said synthetic gas has been tailored so as to have an acid dew point of 185° C. The synthetic gas entering the single condensing stage corresponds to what is normally obtained after $SO_2$ conversion when lean feed gases, i.e. gases containing well below 6 vol % $SO_2$, for example 0.1 vol % $SO_2$ are treated.

In many practical situations, however, also strong feed gases, i.e. gases containing 6-30%, particularly 10-30 vol % $SO_2$ need to be treated. In plants having a single wet condensing stage, such as in U.S. Pat. No. 5,198,206 the strong feed gas to the plant need to be substantially diluted in air so that the acid dew point of the gas prior to the single wet condensation stage is kept at about 260° C., since the higher the content of $SO_2$ and $SO_3$ in the gas the higher its acid dew point. In this manner, acid mist emissions can be kept at about 10-20 ppmv.

A substantial air dilution, for instance from a strong gas containing 14 vol % $SO_2$ to a gas containing 5-6 vol % $SO_2$ so as to reduce its dew point to 260° C. prior to entering the wet condensing stage has the disadvantage that the process operates with a larger gas flow, and accordingly larger and more expensive plants are required. This problem becomes more pronounced with increasing $SO_2$ in the feed gas. Another disadvantage is that depending on the condenser design and process conditions some acid mist is still emitted from the condenser. Although current acid mist emissions of about 20 ppmv may be permissible, more stringent environmental legislations that will require yet even lower emissions of 5-10 ppmv or even below 5 ppmv are expected in the near future. In particular, acid mist emissions from single wet condensing plants treating gases containing 6 vol % to 30 vol %, particularly 10 vol % to 30 vol % $SO_2$ cannot be kept below 10-20 ppmv $H_2SO_4$ by air diluting the gas to a 260° C. acid dew point.

It would therefore be desirable to be able to provide a feed gas to the wet condensation stage with an acid dew point of below 260° C. without requiring a substantial air dilution of the feed gas containing $SO_2$ whilst at the same time achieving acid mist emissions of about 20 ppmv according to current acid mist emission requirements.

It would also be desirable to be able to provide a process of producing sulfuric acid from a feed gas containing $SO_2$ without requiring substantial air dilution of said feed gas whilst at the same time achieving acid mist emissions of 5-10 ppmv or below 5 ppmv.

Another disadvantage of a process with a single wet condensation stage is the equilibrium limitation of the $SO_2$ conversion. Even with the most active commercial $SO_2$ oxidation catalysts, the maximum total $SO_2$ conversion is limited to 99.5-99.7% depending on the $O_2$ concentration in the gas. For higher conversions, expensive tail gas scrubbing with e.g. $H_2O_2$ or NaOH must be included. For instance, by air diluting a feed gas containing 8-9 vol % $SO_2$ to a gas containing 5-6 vol % $SO_2$, the equilibrium conversion at 380° C. of $SO_2$ to $SO_3$ in the catalytic converter upstream the condensation stage may only be increased from 99.5 to 99.7%, which falls short of today's $SO_2$ conversion requirements of above 99.7%.

It has been known for years that the conversion of $SO_2$ to $SO_3$ may be increased by introducing a second absorber before the final conversion stage, yet the final absorption stage has normally been conducted under dry conditions, where the molar ratio of $SO_2+SO_3$ to water in the feed gas to the $SO_2$ converter is above 1. For instance U.S. Pat. No. 4,368,183 discloses a wet/dry-process of producing concentrated sulfuric acid utilizing an intermediate absorption stage. $SO_2$-containing gases are catalytically converted to $SO_3$ in a first contacting stage in a $SO_2$ converter. The gas containing $SO_3$ and water vapor, where the molar ratio of water to $SO_3$ is below one is then passed to an intermediate absorption stage including a Venturi where sulfuric acid is produced. Dry exit gas from this intermediate stage is returned to the $SO_2$ converter so that remaining $SO_2$ is catalytically converted to $SO_3$ in a second contacting stage and finally passed to an end absorber, in which the final production of sulfuric acid is conducted under dry conditions in the substantially $SO_2$-free gas. Hence, this process can handle feed gases with a molar ratio of $SO_2+SO_3$ to water above about 1, whereby the gas emerging from the intermediate absorption tower is dried by the sulfuric acid. For feed gases with more water than $SO_2+SO_3$ on a molar basis, the gas emerging from the intermediate absorption stage contains water vapor that condenses in the final absorption tower as an acid mist, which is difficult to remove in an economical way.

It would be desirable to be able to treat feed gases with a molar excess of water vapor compared to $SO_2+SO_3$ and still be able to produce concentrated sulfuric acid of above 98 wt % since such wet feed gases are common in industrial operations, for example from sulfur burners, metallurgical operations such as ore roasting and from combustion of hydrogen-containing fuels, e.g. spent acid from petrochemical alkylation, hydrogen sulfide, ammonium sulfate waste and fossil fuels including heavy oil residues and petroleum coke. In particular, it would be desirable to treat these gases whilst at the same time being able to cope with more stringent requirements for $SO_2$ conversion of above 99.7% and acid mist emissions of 5-10 ppmv or below 5 ppmv.

SUMMARY OF THE INVENTION

It is therefore an object of the invention to provide a process of producing concentrated sulfuric acid from a feed gas containing 0.1 vol % to 30 vol % $SO_2$, in particular a strong feed gas containing 6 vol % to 30 vol % $SO_2$ that enables the gas entering the final wet condensing stage to have an acid dew point of below 260° C., whilst at the same time achieving current requirements of acid mist emissions of about 20 ppmv without resorting to substantial air dilution of said strong feed gas.

It is also an object of the invention to provide a process of producing concentrated sulfuric acid from a feed gas containing 0.1 to 30 vol % $SO_2$, in particular a strong feed gas containing 6 to 30 vol % $SO_2$ that is capable of achieving more stringent requirements of acid mist emissions, i.e. 5-10 ppmv or below 5 ppmv without resorting to substantial air dilution of said strong feed gas.

It is another object of the invention to provide a process of producing concentrated sulfuric acid of above 98 wt % from a feed gas containing 0.1 vol % to 30 vol % $SO_2$, in particular a strong feed gas containing 6 vol % to 30 vol % $SO_2$ with $SO_2$ conversions of above 99.5% or even above 99.7% whilst simultaneously avoiding substantial air dilution of said strong feed gas.

These and other objects are achieved by the process of the invention.

According to the invention we provide a process of producing sulfuric acid from feed gases containing 0.1-30% $SO_2$ comprising the steps of:

(a) passing the feed gas to a first catalytic conversion step in which $SO_2$ is oxidized to $SO_3$ over one or more catalyst beds, (b) cooling the $SO_3$-containing gas from said first contacting step by passing said gas to an intermediate condensing stage withdrawing a gas containing unconverted $SO_2$ and unabsorbed $SO_3$ and withdrawing a product stream of concentrated sulfuric acid, (c) reheating said gas containing unconverted $SO_2$ and unabsorbed $SO_3$, (d) passing the gas from step (c) to a second catalytic conversion step, in which unconverted $SO_2$ is oxidized to $SO_3$ over one or more catalyst beds, (e) cooling the gas from step (d) to a temperature of 0° C. to 100° C. above the acid dew point of said gas, (f) passing the gas from step (e) with a molar ratio of $H_2O$ to $SO_3$ of at least 1.05 calculated under the assumption that $SO_3$ is not hydrated to $H_2SO_4$, and acid dew point of below about 240° C. to a final wet condensing stage, in which the remaining sulfuric acid is condensed by cooling of said gas by indirect or direct heat exchange with a cooling medium, (g) providing in the gas, prior to conducting step (f), a content of $10^{10}$ to $10^{13}$ solid particles per $Nm^3$ per vol % $SO_3$ calculated under the assumption that $SO_3$ is not hydrated to $H_2SO_4$, (h) withdrawing from the final wet condensing stage of step (f) a stream of 70-98 wt % sulfuric acid.

We have found that acid mist emissions from strong gas plants (gases containing about 6% to 30%, particularly 10 vol % to 30 vol % $SO_2$) cannot always be kept below 10-20 ppmv $H_2SO_4$ because the window for acid mist control defined by the number of solid particles acting as nuclei for the capture of $H_2SO_4$ and which are added to the gas prior to the final condensing stage narrows as the acid dew point of the gas increases and narrows particularly drastically at acid dew points above 240° C.

We have realized that the minimum acid mist emission from the final condenser increases with increasing sulfuric acid dew point of the feed gas entering the final condenser and that the acid mist emission can be kept below 5-10 ppmv if the dew point is kept below 260° C., preferably below 250° C., more preferably below 240° C. More specifically, we have found that by condensing sulfuric acid in two stages the acid dew point in the feed gas to the final wet condenser is kept a low value, normally below 240° C., for instance 220° C., thereby enabling the expansion of the window of acid mist control in the final wet condenser so that acid mist control is facilitated and emissions are kept below 10 ppmv and even below 5 ppmv. Hence, the window of solid particles added upstream the final wet condenser and which act as nuclei for the capture of sulfuric acid may be expanded by as much as about one order of magnitude. For example, in a situation with no intermediate absorber where the $SO_2$ containing gas has been air diluted to 5-6% $SO_2$ corresponding to about 260° C. dew point in the gas entering the final wet condenser, the window of solid particles that may be added upstream the final wet condenser in order to keep the acid mist below 5 ppmv is closed, i.e. the addition of such particles will not impede the formation of an acid mist of above 5 ppmv. If the $SO_2$ containing gas has been air diluted to about 250° C. dew point in the gas entering the final wet condenser corresponding to about 3.5 vol % $SO_2$ in the gas, the window of solid particles that may be added upstream the final wet condenser opens at a single discrete value of about $2.2 \cdot 10^6$ particles per $Ncm^3$ (calculated under the assumption that $SO_3$ is not hydrated to $H_2SO_4$). Where the gas entering the final wet condenser has an acid dew point of about 220° C., corresponding to a $SO_2$ containing gas strongly diluted to about 0.8 vol % $SO_2$ said window of addition of particles required to keep acid mist emissions below 5 ppmv expands to a broader range. By the invention acid mist control is facilitated by lowering the acid dew point of the gas to the final condensing stage without substantial air dilution, wet feed gases with a molar ratio of $H_2O$ to $SO_2+SO_3$ above 1 can be treated in a double condensation process with typically 99.9-99.99% $SO_2$ conversion whilst at the same time acid mist emissions are kept at 5-10 ppmv or below 5 ppmv.

It would be understood that the gas entering the final condensing stage is a wet gas having a molar ratio of $H_2O$ to $SO_3$ of at least 1.05, preferably at least 1.1. According to the invention it is also possible to provide a dry feed gas to the process, i.e. a gas having a molar ratio of $H_2O$ to $SO_2+SO_3$ below 1, so that the gas entering the intermediate condensing stage will have a molar ratio of $H_2O$ to $SO_2+SO_3$ below 1, while water is added prior to the final condensing stage, preferably after conducting the second catalytic conversion step in which unconverted $SO_2$ is oxidized to $SO_3$ over one or more catalyst beds, so that the gas entering said final condensing stage will have a molar ratio of $H_2O$ to $SO_3$ above 1.05, more preferably above 1.1. The product acid strength from the intermediate condensing stage increases with increasing feed gas temperatures, but even at temperatures in the feed gas to this stage of 400° C., the maximum acid strength does not exceed 98.4 wt % because of the water content of said feed gas. By conducting the process with deficit of water (molar ratio of $H_2O$ to $SO_2+SO_3$ below 1) in the intermediate condensing stage and excess of water (molar ratio of $H_2O$ to $SO_3$ above 1.05) in the final condensing stage, a product stream from said intermediate condenser of particularly high acid strength is obtained, i.e. above 99 wt %, whilst at the same time it is possible to achieve 99.9-99.99% $SO_2$ conversions and acid mist emissions are kept at 5-10 ppmv or below 5 ppmv.

The addition of water in a process treating dry $SO_2$-containing feed gas in order to provide for excess of water in the gas according to the invention may also be conducted after passing the feed gas to a first catalytic conversion step in which $SO_2$ is oxidized to $SO_3$ over one or more catalyst beds and prior to the intermediate condensing stage, for example by adding water to the $SO_3$-containing gas immediately before it enters the intermediate condensing stage. This situation is desirable where it is less relevant to obtain a product stream of particularly high acid strength, as defined above.

The particles of step (g) in the process may be added in the gas at any stage prior to entering the final wet condensing stage, for instance to the gas entering the $SO_2$ converter, i.e. prior to step (a), or to the gas to be passed to the intermediate condensing stage of step (b). Preferably the particles are provided to the gas resulting from step (e), i.e. in the gas stream from the $SO_2$ converter prior to entering the final wet condensing stage. This enables the proper mixing of the particles in the gas as it flows towards the final condenser and avoids the eventual loss of particles that may arise because of their passage through diverse equipment upstream such as heat exchangers, intermediate condenser and $SO_2$ converter catalyst, had the particles been added at any other stage prior to entering the final wet condensing stage. More preferably, the particles are added immediately downstream said $SO_2$ converter, thereby increasing the mixing length and time of the particles in the gas stream prior to entering the final wet condensing stage.

There is normally no limitation with respect to the chemical composition of the solid particles, or with respect to their size, to enable them to act as nucleation cores. However, they should be as small as possible in order to cause no noticeable pollution of the sulfuric acid produced. The particle size (diameter) is preferably below 10 µm, more preferably below 1 µm, for example within the range 0.001 to 10 µm, such as in the range 0.002 to 0.1 µm. Based on the assumption that each particle forms one acid droplet, it can be easily calculated that there is requested, for example, $3.2 \cdot 10^{11}$ particles/Nm³ to condense 1% of $H_2SO_4$ in the feed gas in the form of droplets of sulfuric acid having a size of 6 µm, the droplets being separated in the filter at a concentration of 75 wt % sulfuric acid and a density of 1.6 g/cm³. At least it can be concluded with a good range of certainty that for optimum separation of the droplets of sulfuric acid there should be added between $10^{10}$ and $10^{13}$ particles present per Nm³ feed gas to the tubes per vol % $SO_3$ in the feed gas (calculated under the assumption that $SO_3$ is not hydrated to $H_2SO_4$).

The process may further comprise cooling the gas from step (a) to a temperature of 0° C. to 100° C., preferably 30° C. to 40° C. above the acid dew point of said gas prior to conducting step (b). This avoids the risk of condensation of $H_2SO_4$ before it is separated from the gas from step (a), i.e. after the first catalytic conversion step in the $SO_2$ converter, and which may result in the damage of mechanical parts in any downstream equipment that may be in contact with the stream. The provision of water in a process treating dry $SO_2$-containing feed gas in order to provide for excess of water in the $SO_3$-containing gas according to the invention may advantageously be conducted by adding water to the gas after cooling the gas from step (a) and before it enters the intermediate condensing stage.

Preferably the feed gas containing $SO_2$ is a strong gas containing 6 vol % to 30 vol % $SO_2$, more preferably 10 to 30 vol % $SO_2$. At these $SO_2$ concentrations the benefit of avoiding substantial air dilution of the feed gas containing $SO_2$ is most pronounced.

In the process of the invention the intermediate condensing stage of step (b) may be conducted in a packed sulfuric acid tower comprising a concentration and condensing zone by contacting the $SO_3$-containing gas stream with liquid sulfuric acid of strength 70-98 wt % flowing countercurrently with the $SO_3$-containing gas. Hence, the cooling of the $SO_3$-containing gas stream occurs by direct heat exchange with liquid sulfuric acid. This type of condenser provides an expedient way of producing sulfuric acid of above 98 wt % and enables also the incorporation of a separate stream of sulfuric acid from another part of the process into an acid recirculation loop in the upper portion of said sulfuric acid tower (intermediate condenser).

The process of the invention may accordingly further comprise returning the stream of 70-98 wt % sulfuric acid of step (h), i.e. acid stream from the final condensing stage, to the intermediate stage (b). The returning of said acid stream to the intermediate condensing stage, preferably to the acid recirculation loop, enables the production of sulfuric acid of higher concentration (above about 98 wt %) than it is otherwise obtainable had the sulfuric acid stream from the final condensing stage not been passed to the intermediate condensing stage. In some instances, the returned stream may advantageously be an acid stream of about 85 wt % sulfuric acid, such as in situations where the final condensing stage is conducted by the passage of the $SO_3$-containing gas co-currently with the condensing sulfuric acid as described below. In other instances, the returned stream may be an acid stream of near 98 wt % sulfuric acid, such as in situations where the final condensing stage is conducted by the passage of the $SO_3$-containing gas countercurrently with the condensing sulfuric acid, as also described below.

The intermediate condensing stage of step (b) may also be conducted in substantially vertical tubes in which the cooling of the $SO_3$-containing gas stream takes place by indirect heat exchange with a cooling medium, in which said cooling medium is air flowing countercurrently. In one particular embodiment said $SO_3$-containing gas flows countercurrently with the condensing sulfuric acid. Hence, sulfuric acid produced in the process travels downwards as it condenses in the tube walls while the $SO_3$-containing gas travels in opposite direction. Preferably, the air flows countercurrently outside said tubes. In this form of operation, sulfuric acid strength at the bottom of the condenser in the range 70-98 wt % is normally obtained and if required acid strengths of above 98 wt %, for instance 98.5 wt % are also possible.

The intermediate condensing stage of step (b) may also be conducted in substantially vertical tubes in which the cooling of the $SO_3$-containing gas stream takes place by indirect heat exchange with a cooling medium, in which said cooling medium is air flowing countercurrently and wherein said $SO_3$-containing gas flows co-currently with condensing sulfuric acid. This type of condenser is in particularly advantageous in that it is less costly and easier to operate than conventional countercurrent condensers as described above. The condenser enables the down-flow of the $SO_3$-containing gas together with the sulfuric acid being formed in the tubes, thereby eliminating the risks of potential flooding problems that may otherwise be encountered in cooled tubes where the $SO_3$-containing gas and the formed sulfuric acid flow countercurrently. Flooding is a condition where the condensing sulfuric acid is prevented from falling downwards due to the drag force of the $SO_3$-containing gas traveling upwards, and which results in an undesired increase in gas pressure drop. Preferably, the air flows countercurrently outside said tubes. Since the sulfuric acid strength at the bottom of the condenser is normally weak, i.e. in the range 70-85 wt % the use of this type of condenser as intermediate condensing stage is suitable for instances where the requirements in acid strength are less important. If required, acid strengths of above 98 wt % are obtainable by further conducting the sulfuric acid stream leaving the intermediate condensing stage and having an acid strength of 70-85 wt % to a subsequent concentration stage, as described in U.S. Pat. No. 6,090,364. The concentration stage may thus advantageously be conducted in a packed tower, where hot air passes below the section of the tower containing the packing of acid resistant bodies, such as ceramic Raschig rings or saddles. Air leaving at the top of the packed tower is mixed with $SO_3$-containing gas entering the intermediate condensing stage, while concentrated sulfuric acid leaves at the bottom and is further cooled to a stream having the desired acid strength, normally above 98 wt %.

In the process, the cooling of the gas in the final condensing stage is preferably conducted in substantially vertical tubes by indirect heat exchange with a cooling medium, in which said cooling medium is air. Similar to the situation for the intermediate condensing stage, in one particular embodiment said $S_{O3}$-containing gas flows countercurrently with condensing sulfuric acid. Hence, sulfuric acid produced in the process travels downwards as it condenses in the tube walls while the $S_{O3}$-containing gas travels upward the one or more vertical tubes. Preferably, the air flows countercurrently outside said tubes. By this form of condensing, sulfuric acid strength at the bottom of the condenser in the range 70-98 wt % is normally obtained and if required acid strengths of above 98 wt %, for instance 98.5 wt % are also possible. In another embodiment, said $S_{O3}$-containing gas flows co-currently with condensing sulfuric acid. The formation of sulfuric acid according to this type of condenser is in particularly advantageous in that it is less costly and easier to operate than conventional countercurrent condensers as described above. The condenser enables the downflow of the $S_{O3}$-containing gas together with the sulfuric acid being formed in the tubes, thereby eliminating the risks of potential flooding problems that may otherwise be encountered in cooled tubes where the $S_{O3}$-containing gas and the formed sulfuric acid flow countercurrently. Preferably, the air flows countercurrently outside said tubes. Since the sulfuric acid strength at the bottom of the condenser is normally weak, i.e. in the range 70-85 wt % the use of this type of condenser as the final condensing stage is suitable for instances where the requirements in acid strength are less important, or where it may be expected that the desired acid strength still may be obtained by returning the acid stream of 70-85 wt % to the intermediate condensing stage. It would therefore be understood that by the invention it is possible to conduct the final condensing stage in an apparatus which is less costly and normally also easier to operate than conventional condensers with countercurrent streams of $S_{O3}$-containing gas and condensing sulfuric acid. The lower acid strength obtained in the final condensing stage is compensated by the returning of the acid stream to the intermediate condensing stage, which is preferably conducted in a packed sulfuric acid tower. If required, acid strengths of above 98 wt % are obtainable by further conducting the sulfuric acid stream leaving the final condensing stage and having an acid strength of 70-85 wt % to a subsequent concentration stage, as described in U.S. Pat. No. 6,090,364. The concentration stage may thus advantageously be conducted in a packed tower, where hot air passes below the section of the tower containing the packing of acid resistant bodies, such as ceramic Raschig rings or saddles. Air leaving at the top of the packed tower is mixed with $S_{O3}$-containing gas entering the final condensing stage, while concentrated sulfuric acid leaves at the bottom and is further cooled to a stream having the desired acid strength, normally above 98 wt %.

The cooling of the gas in the final condensing stage may also be conducted in a packed sulfuric acid tower by direct heat exchange with circulating sulfuric acid. Thus, the invention also encompasses a process, wherein the remaining sulfuric acid in gas stream containing $SO_3$ and $H_2SO_4$-vapor is condensed in the final condensing stage by cooling the gas with circulating sulfuric acid in a sulfuric acid tower. Preferably, the sulfuric acid runs in countercurrent to the gas stream containing $SO_3$ and $H_2SO_4$-vapor through a concentrating or absorption zone containing filler bodies whereby $H_2SO_4$ is absorbed in recycled sulfuric acid, as for instance described in U.S. Pat. No. 4,348,373.

BRIEF DESCRIPTION OF THE DRAWINGS

The invention is illustrated by the accompanying drawings, in which.

DETAILED DESCRIPTION OF THE PREFERRED EMBODIMENTS

Figure 1:
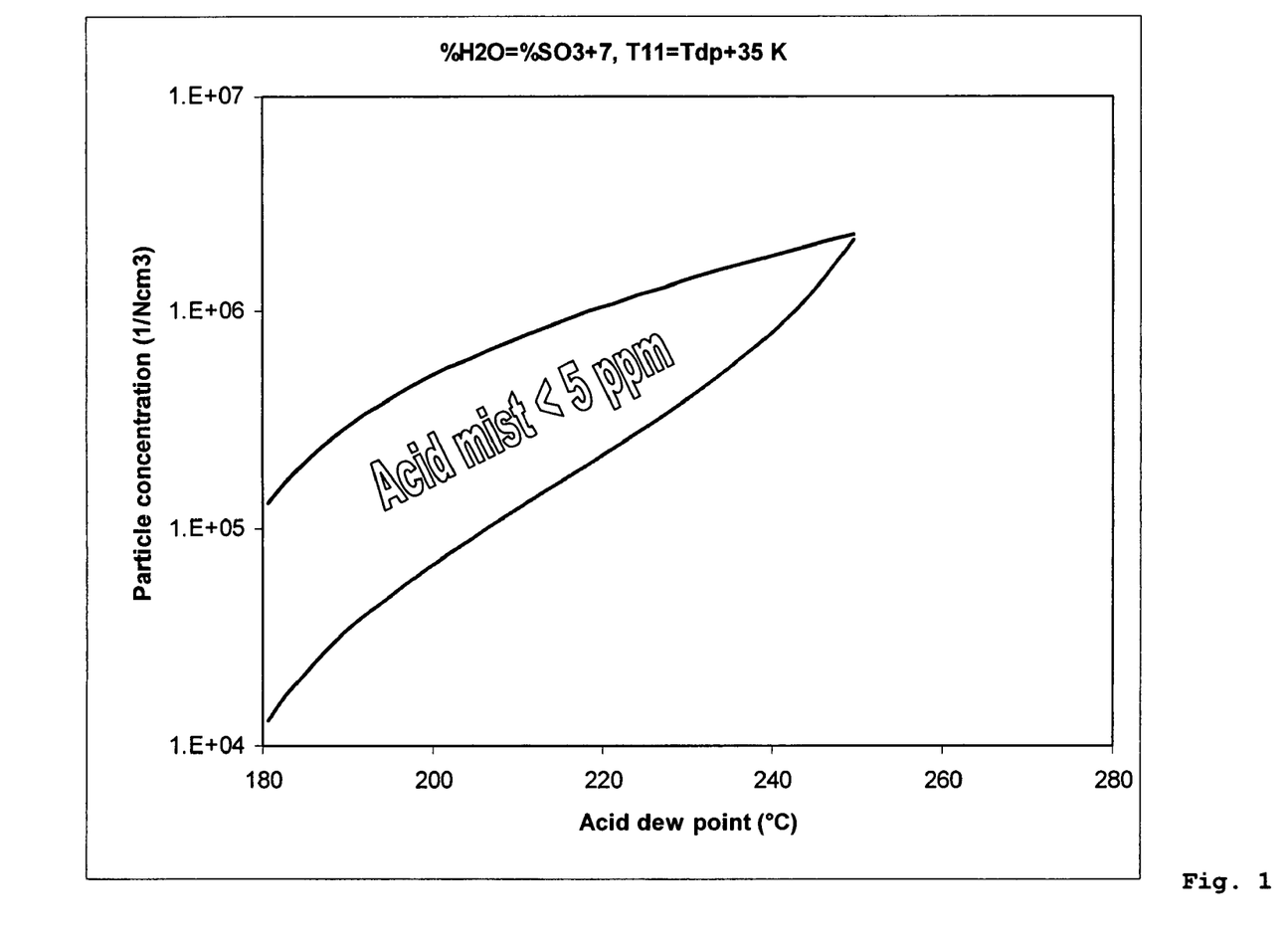
FIG. 1 shows the window of acid mist control (calculated under the assumption that $SO_3$ is not hydrated to $H_2SO_4$) where emissions below 5 ppmv from the final wet condensing stage are obtainable as a function of acid dew point of a gas entering said condensing stage.

We have found that the higher the acid dew point of the gas entering the condenser the narrower the window of acid mist control within which the addition of said nuclei still enables emissions of acid mist below 5 ppmv. This is illustrated by FIG. 1 which shows an example for a gas entering a final wet condensation stage with an excess of water with respect to $SO_3$ (vol % $H_2O$=vol % $SO_3$+7) and where the temperature of the gas is 35° C. above its acid dew point. A strong gas from a spent acid chemical operation or any other strong gas, which may have been air diluted to about 8 vol % to 9 vol % $SO_2$ prior to an $SO_2$ converter (corresponding to 8-9% vol. $H_2SO_4$ (g) in the gas after the SO$_2$ converter entering the single condensing stage) and having a dew point of about 270° C. lies outside the window of acid mist control. At this acid dew point, the acid mist emission from the final wet condenser can only be controlled at 70-90 ppmv by particle addition in the very narrow range of 3.0·10$^6$-3.2·10$^6$ particles per Ncm$^3$. This problem may be alleviated by strongly diluting the gas in air so as to form a gas with 5-6 vol % SO$_2$, which has a dew point of about 260° C., but the gas will still be outside said window of acid mist control. At this acid dew point the acid mist emission from the final wet condenser can only be controlled at 10-20 ppmv by particle addition in a broader range, normally 2.0·10$^6$-2.7·10$^6$ particles per Ncm$^3$.

Below about an acid dew point of about 250° C., the window of acid mist control opens. At this dew point the window is still narrow (only within a very narrow range of particles added before the final wet condensation stage is conducted it is possible to maintain acid mist emissions within levels below 5 ppmv) and significant dilution in air of the SO$_2$ containing gas is required, which as mentioned above is inexpedient due to the need of operating a plant of larger capacity. By the invention, the provision of a process in which the wet gas entering the final condensing stage has an acid dew point below about 240° C. enables that the window of solid particles added upstream the final condenser so that acid mist is below 5 ppmv is opened and optionally significantly expanded, for example from 0.8·10$^6$-1.8·10$^6$ particles per Ncm$^3$ corresponding to air dilution to about 240° C. dew point in the gas entering the final wet condenser, to a broader 0.2·10$^6$-1.0·10$^6$ particles per Ncm$^3$ where the acid dew point is 220° C.

The provision of particles acting as condensation nuclei may be effected by conventional means as for instance disclosed in our own U.S. Pat. No. 5,198,206 by adding a smoke from an electric arc or welding by combusting hydrocarbons with over two carbon atoms or by combusting silicone oil.

The gas entering the final wet condensing stage step is preferably heated from an inlet temperature $T_{A1}$ of 0-50° C. to an outlet temperature $T_{A2}$ satisfying the condition $$T_{A2} > T_1 - (75 - 4 \cdot S - 2 \cdot W) \cdot (1 + h_i/h_o) \quad (1)$$

where $T_{A2}$ and $T_1$ are expressed in °C., $T_1$ is the temperature of the gas entering the final condensing stage, S is the vol % of SO3, and W is the vol % of H2O, calculated under the assumption that SO$_3$ in the gas is unhydrated, $h_i$ is the heat transfer coefficient on the inside of the tube expressed in W/m$^2$/K, and $h_o$ is the heat transfer coefficient on the outside of the tube expressed in W/m$^2$/K.

Figure 2:
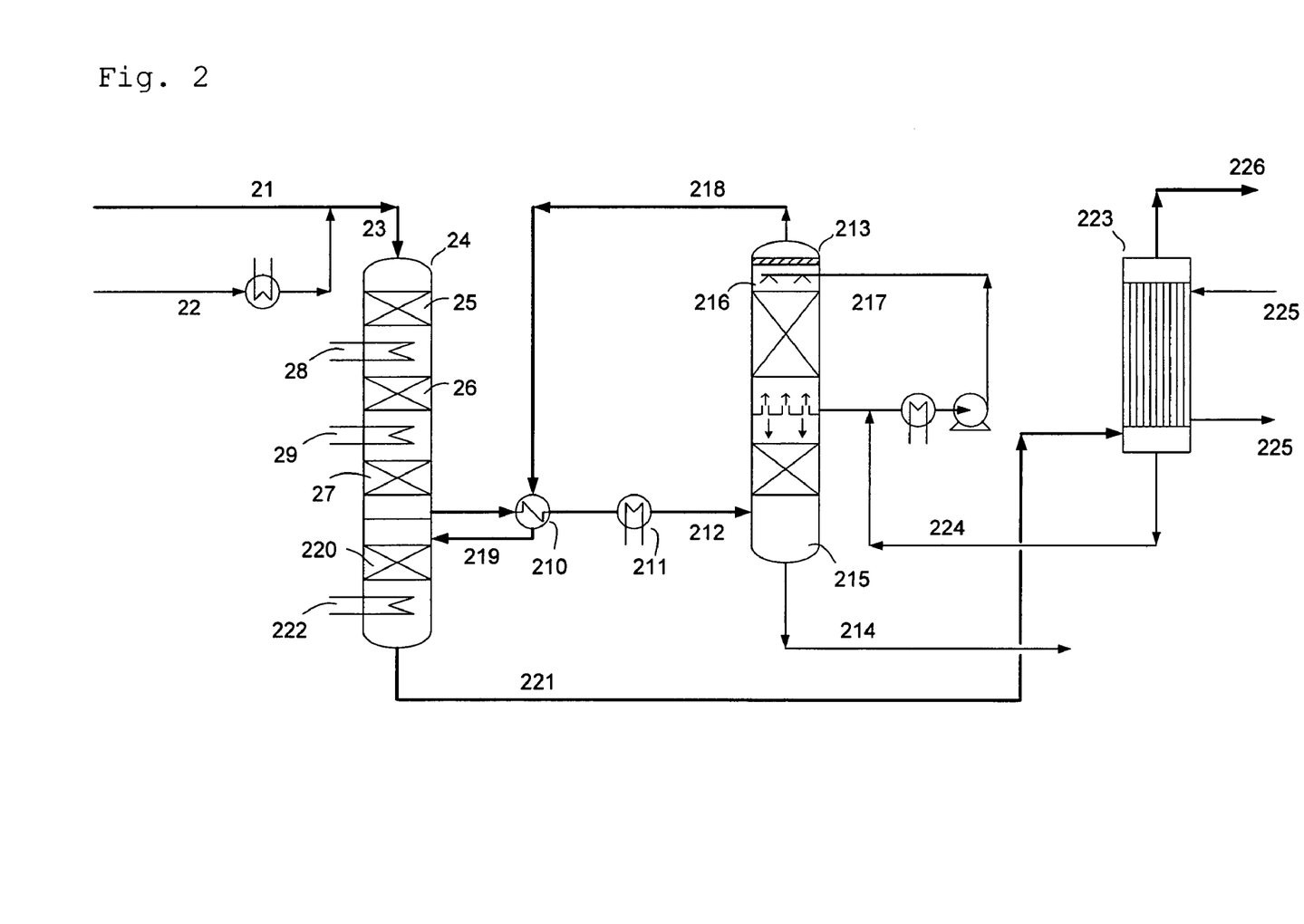
FIG. 2 is a flow sheet according to a particular embodiment of the process, in which the intermediate condensing stage is conducted in a packed sulfuric acid tower and the final condensing stage is conducted in an air cooled condenser with vertical tubes and with the $SO_3$-containing gas flowing counter-currently with condensing sulfuric acid.

In FIG. 2 a flow sheet of the double-condensation wet sulfuric acid process is shown for a case with a feed stream 21 of 18000 Nm$^3$/h feed gas having 14% SO$_2$, 3% O$_2$ and 23% H$_2$O. The SO$_2$ gas is diluted with 9620 Nm$^3$/h preheated air represented by stream 22 in order to supply oxygen in a molar ratio of O$_2$/SO$_2$=1. The resulting feed gas 23 passing to the reactor 24 (SO$_2$ converter) contains 9.1% SO$_2$, which is converted to SO$_3$ over three adiabatic catalytic beds 25, 26, 27 with intermediate bed coolers 28 and 29. The SO$_3$ gas is subsequently cooled in heat exchangers 210 and 211 to a temperature of 310° C. resulting in stream 212 which is well above its acid dew point (278° C.). In the intermediate condenser tower 213, the sulfuric acid content of the gas is condensed as a 98.3 wt % final product in stream 214. The intermediate condenser 213 is provided with an adiabatic concentration zone at its bottom 215, where the acid is concentrated from 96 wt % to above 98 wt %, and a cooled condensation zone at its upper portion 216 with acid recirculation 217. The SO$_3$-containing gas 212 from the first contacting stage is preferably introduced in the concentration zone 215 of said intermediate condenser 213. This enables that a relatively high temperature, normally about 300-320° C. be kept at the bottom of the intermediate condenser, i.e. in the concentration zone, whereby sulfuric acid of relatively high concentration, i.e. 98.3% wt, is produced. The gas leaves the intermediate condenser 213 as stream 218 at 150° C. and contains 0.42% SO$_2$, 0.38% H$_2$SO$_4$ vapor and possibly some sulfuric acid mist. The gas is reheated in heat exchanger 210 to 375° C. causing the acid mist to evaporate. The remaining SO$_2$ in stream 219 is converted over a fourth catalyst bed 220, which brings the total SO$_2$ conversion up to 99.95%. The exiting gas 221 is cooled from about 390° C. to 260° C. in boiler 222. The remaining sulfuric acid vapor carried by stream 221 having about 0.1 vol % SO3, 0.7 vol % H$_2$SO$_4$, 8% H$_2$O and acid dew point of about 220° C. is condensed in a normal air-cooled wet sulfuric acid condenser 223 with air cooled vertical glass tubes with countercurrent passage of the SO$_3$-containing gas and condensing sulfuric acid, coils for heat transfer enhancement, tube demisters, and acid mist control by prior addition of condensation nuclei particles. The glass tubes are provided with acid mist filters which serve to separate droplets of sulfuric acid in the gas. Said filters are advantageously mounted near, in or on top of each glass tube in gas tight connection therewith, whereby said droplets flow back downwards through the tube. The acid mist filter in each tube is preferably a high velocity filter at a gas velocity of 1-7 m/s and comprises filaments or fibers with a diameter of 0.05 mm to 0.5 mm. The fibres or filaments are present in an amount, a layer thickness and configuration that ensure a pressure drop through the filter of 2 mbar to 20 mbar.

The acid mist control may be effected by providing a control system in which an acid mist meter in the gas stream leaving the final wet condensation stage is adapted to a process computer. The signal from the acid mist meter indicating an acid mist value below 10 ppmv, preferably about or below 5 ppmv, is received by the process computer so as to regulate the addition of solid particles as condensation nuclei in the form of e.g. smoke from hydrocarbon combustion upstream the final wet condensation stage, as described above. Hence, the rate of addition of particles acting as condensation nuclei is controlled according to known principles by the aid of a control loop containing a continuously operating acid mist meter positioned downstream the final wet condenser. By the invention, the automatic control of particle addition is greatly enhanced, as a wider window of particles (number of particles) may be added to the gas stream prior to the final condensing stage without risking undesired excursions in the values of acid mist, so that low acid mist emissions of for instance 5 ppmv or below are at any time safely maintained.

Concentrated sulfuric acid with strength of 95.5 wt % leaves the final condenser 223° C. at 220° C. as stream 224 and enters in the recirculation system 217 of the intermediate condenser 213. Cooling air stream 225 at 25° C. serves as cooling medium and leaves the final condenser at 200° C. The gas from final condenser leaves as stream 226 at about 100° C. with an acid mist content of about 5 ppmv and is then directed to a stack (not shown). Table 1 resumes relevant flow compositions of the process of FIG. 2.

The total $SO_2$ conversion obtainable with reasonable catalyst volumes in $SO_2$-converter 24 depends on the $SO_3$+$H_2SO_4$ concentration from the intermediate condenser 213 and the inlet temperature to fourth bed 220. If the gas is cooled to a lower temperature in the condensing zone 216 of the intermediate condenser 213, $SO_2$ conversion can be increased or the catalyst volume in bed 220 reduced.

The acid mist emission from the final condenser 223 is low, normally about 5 ppmv and it is easy to control due to the low dew point of the feed gas 221, which is approximately 220° C. The small particles acting as nuclei may be added to the gas before inflow to the final condenser as smoke or as an aerosol of solid particles in an amount corresponding to $10^{10}$ to $10^{13}$ particles per $Nm^3$ per $SO_3$ by vol % in the gas stream at the entry of the final condenser calculated under the assumption that $SO_3$ is unhydrated to $H_2SO_4$. The low acid mist emission represents a significant advantage compared to the normal situation where strong feed gases containing 6-30 vol % $SO_2$, particularly 10-30 vol % $SO_2$ are treated by a single condensing stage after the $SO_2$ converter, whereby the feed gas to said condensing stage is air diluted to 5-6% vol. $SO_2$ resulting in an acid dew point of 260° C. and acid mist emissions above 5 ppmv.

Saturated steam at 40 bar g can be produced in boilers 211 and 222. In order to control the temperatures in the $SO_2$ converter the intermediate bed coolers 28 and 29 are preferably steam superheaters. The dilution air 22 can be taken from the hot final condenser cooling air stream 225 leaving at about 200° C., but additional duty must be supplied to heat the air to the $SO_2$-converter 24 inlet temperature of 410° C. A higher fraction of the heat transferred in the final condenser 223 is recovered if the hot cooling air 225 can be recycled as combustion air in an incineration step prior to the SO2-converter in plants combusting e.g. spent alkylation acid or $H_2S$.

The reheat of the acid-mist containing off-gas 218 from the intermediate condenser in heat exchanger 210 may require heating in two steps: a first acid-resistant heat exchanger close to the intermediate condenser mounted for example in the top of intermediate condenser 213, which brings the gas temperature above the dew point, and a second heat exchanger to bring the temperature of stream 219 up to the 375° C. before re-entering the $SO_2$ converter 24. The latter may include a bypass in order to control the temperature to 375° C. Alternatively, the first heating step may be carried out by recirculation of hot gas.

Heat transfer salt may alternatively be used as an intermediate for transfer of heat from the process to a steam system especially for cold feed gases (metallurgical), where the steam flow from the boilers is too small to feed the intermediate bed coolers.

The intermediate condenser 213 is preferably a sulfuric acid tower comprising a concentration and condensing zone with liquid sulfuric acid running in countercurrent to the gas stream containing $SO_3$ and $H_2SO_4$-vapor through a concentrating or absorption zone containing filler bodies whereby $H_2SO_4$ is absorbed in recycled sulfuric acid, as for instance described in U.S. Pat. No. 4,348,373. The intermediate condenser 213 may also be constructed as a brick-lined tower with ceramic packings, such as Torus saddles for the case of a 2.0 m diameter vessel. As described above the intermediate condenser may alternatively be a wet sulfuric acid condenser of the same type as the final condenser 223, in which said final condenser 223 is provided with air cooled glass tubes.

The off-gas stream 218 from the intermediate condenser 213 may contain some acid mist and depending on the required total $SO_2$ conversion in the plant up to 1000 ppmv acid mist may be accepted (the conversion in the fourth bed 220 depends on the $SO_2$+$SO_3$ concentration). According to the teaching of U.S. Pat. No. 4,348,373 the intermediate condenser for the production of sulfuric acid may be operated substantially free of acid mist in the off-gas if the following condition is fulfilled:

$$T > 140 + 6\alpha + \beta + 0.2(T_1 - T_3) \quad (2)$$

where
- T is the temperature [°C.] of the acid to be recycled leaving the intermediate condenser,
- α is the concentration of the feed gas 212 defined by $SO_3$+$H_2SO_4$ [mole %],
- β is the water concentration [mole %] of the feed gas 212,
- $T_1$ is the temperature [°C.] of the feed gas 212, and
- $T_d$ is the dew point temperature [°C.] of the feed gas 212.

According to formula (2), excessive acid mist emission can be avoided, because the temperature T=247° C. is higher than the value calculated from the formula, which is 218° C.

Figure 3:
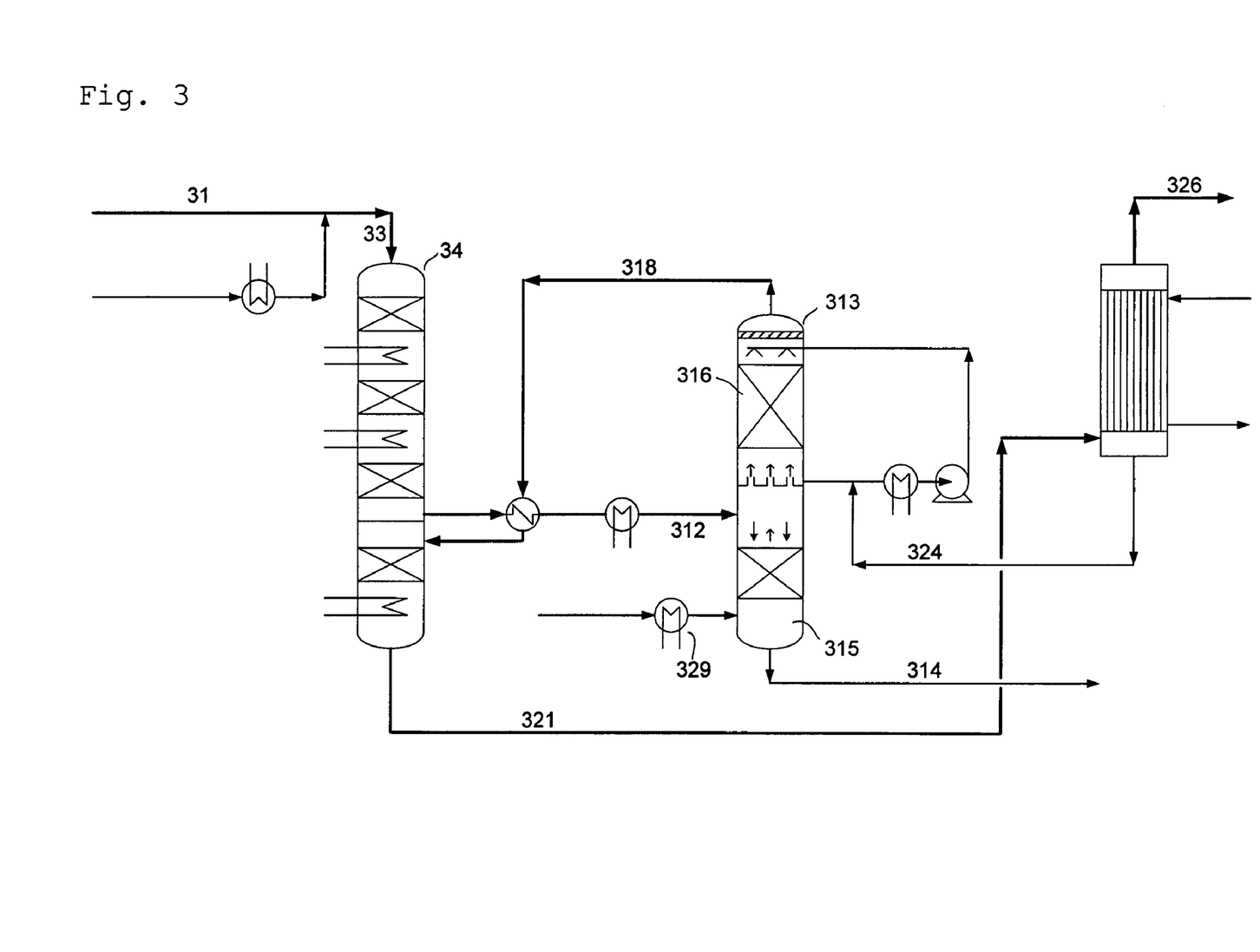
FIG. 3 is a flow sheet of a further embodiment of the invention for increasing the sulfuric acid strength of the intermediate condensing stage.

The demand for high-concentration acid in alkylation plants in oil refineries calls for 98.5-99 wt % sulfuric acid product. The product acid strength increases with increasing feed gas temperature in stream 212, but even at 400° C. in said feed gas the maximum acid strength does not exceed 98.4 wt % because of the water content of the feed gas 212. As a result, production of >98.5 wt % sulfuric acid is difficult to achieve. In the intermediate condensing stages of conventional wet/dry processes, such as U.S. Pat. No. 4,368,183 the water vapor pressure over oleum, i.e. sulfuric acid with dissolved $SO_3$, is very low and as a result water is easily removed at this stage. However, where there is an excess of water with respect to $SO_3$ in the gas, as in the present invention, the $SO_3$ will react with water in a molar ratio 1:1 to produce sulfuric acid. At equilibrium, the acid will absorb additional water and thereby reduce its acid strength until the water vapor pressure over the acid, as determined by the acid strength and the temperature is the same as the water content in the gas. We have found that in the double condensation process according to the present invention, the acid strength can be increased if hot air at a temperature of 400-550° C., preferably 500° C. is introduced instead of process gas of normally about 300-320° C. in the concentration zone at the bottom of the intermediate condensation tower 213. This is shown in FIG. 3 for the same feed gas conditions as in FIG. 2. The $SO_3$ gas stream 312 from the $SO_2$ converter 34 is sent directly to the condensation zone 316 of the intermediate condenser 313, and the acid product flows to the concentration zone 315, where it is concentrated to 98.6 wt % by countercurrent contact with hot air at 500° C. Preferably, the air has been previously preheated in heat exchanger 329 from 150-300° C. to 400-550° C., preferably 500° C. Hence, in one particular embodiment of the invention, the process further comprises passing hot air at a temperature of 400-550° C. to the concentration zone of the intermediate condensation stage and passing the $SO_3$-containing gas from the first catalytic conversion step directly to the condensation zone of said intermediate condensation stage, whereby concentrated sulfuric acid is produced by counter current contact with said hot air. Table 2 resumes relevant flow compositions of the process shown in FIG. 3.

Figure 4:
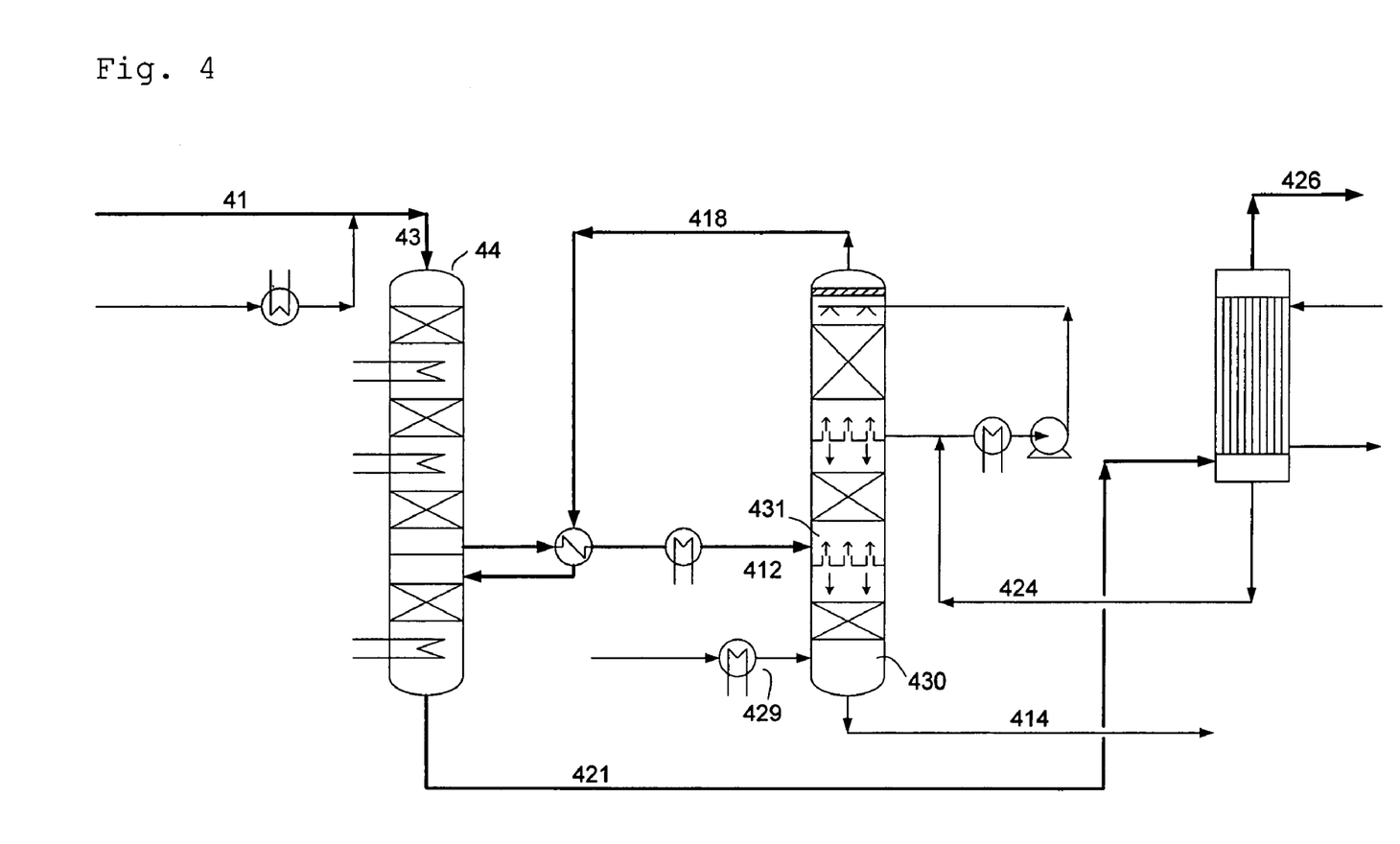
FIG. 4 shows a flow sheet according to another embodiment of the invention in which the intermediate condensing stage is provided with two acid concentration zones.

In another embodiment of the invention, the process further comprises dividing said intermediate condensation stage into at least an upper and a bottom concentration zone, passing the $SO_3$-containing gas from the first catalytic conversion step to the upper concentration zone of the intermediate condensation stage and passing hot air at 400-550° C. to the bottom concentration zone, whereby concentrated sulfuric acid is produced by countercurrent contact with said hot air. Accordingly, the intermediate condensing stage is separated in at least two concentration zones. In the first, upper concentration zone, the acid from the condensation zone is concentrated from 95 wt % to 98.2 wt % by contact with the $SO_3$-containing gas stream to the intermediate condensing stage having a temperature of about 300° C. and in the second, bottom concentration zone, where hot air at 450-550° C., preferably 500° C. is added, the acid is further concentrated to the desired value of 98.6 wt %. This enables that only about the half of the amount of hot air (Nm3/h) as that required in the scheme of FIG. 3 is necessary for the final concentration to 98.6 wt %. This process is illustrated in FIG. 4 for the same feed gas conditions as in FIG. 2 or 3. Table 3 resumes the relevant flow compositions. The $SO_3$ gas stream 412 from the $SO_2$ converter 44 is sent directly to a first concentration zone 431 and the acid product flows to a second concentration zone 430, where it is finally concentrated to 98.6 wt % by counter current contact with hot air at 400-550° C., preferably 500° C. The air is previously preheated in heat exchanger 429 from 150-300° C. to 450-550° C., preferably 500° C.

Figure 5:
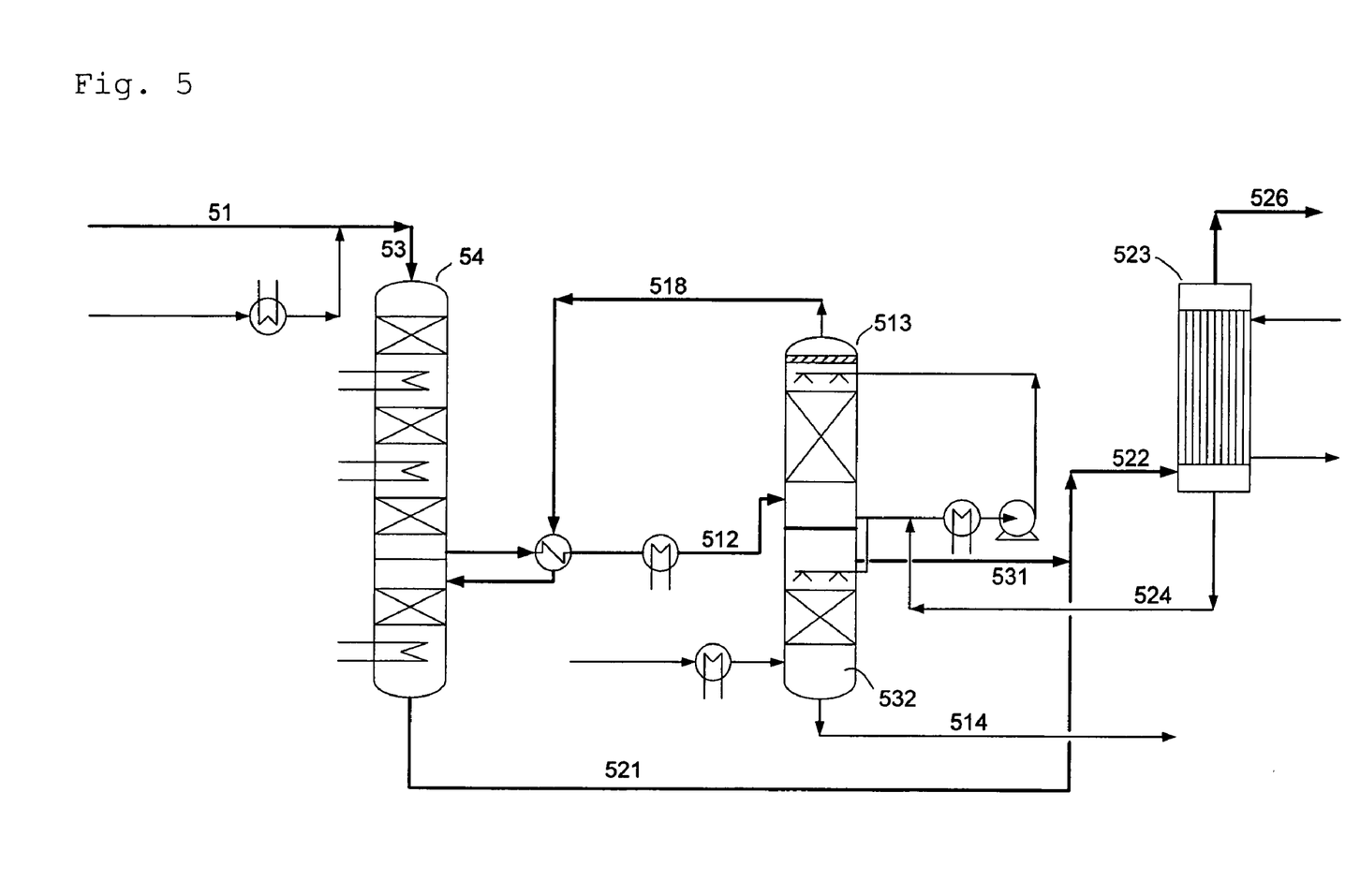
FIG. 5 shows a flow sheet with yet another embodiment in which off-gas from a hot air concentrator is sent to the final wet condensing stage.

In yet another embodiment of the invention the process may further comprise diverting a stream of off-gas from the hot air which has been in contact with sulfuric acid in the intermediate condensation stage to the final condensing stage by combining said stream of off-gas with the cooled $SO_3$-containing gas stream withdrawn from the second catalytic conversion step. Accordingly, off-gas from the hot air concentration zone in the intermediate condensing stage is sent to the final condensing stage. This enables a reduction in size of the intermediate condenser as well as a reduction of size in the one or more beds in the second contacting stage of the $SO_2$ converter. This is illustrated in FIG. 5, where off-gas stream 531 from the concentration zone 532 of intermediate condensation stage 513 is combined with the stream 521, from the second catalytic conversion step in $SO_2$ converter 54, entering the final condenser 523 as stream 522. Table 4 resumes relevant flow compositions for this embodiment of the process.

The inventive process is also useful for the retrofitting of existing sulfuric acid plants already comprising an $SO_2$ converter and a single wet condensing stage. The existing single wet condenser may then be used as final wet condenser and the $SO_2$ converter may also be reused. In the retrofitting of the existing plant, a new intermediate condenser, an additional catalyst bed in the $SO_2$ converter and a heat recovery system are adapted to the plant. The retrofitting enables, apart from the advantages already mentioned including low acid mist emission, the possibility of increasing plant capacity with few modifications in the existing plant. In the inventive process, the flow of the feed $SO_2$-gas to the plant may be increased, while the flow of dilution air is decreased so as to maintain a substantially constant total flow through the plant before and after retrofitting.

EXAMPLE

Table 5 shows a comparative example of a process with intermediate condensation stage and final wet condensation stage according to the invention and a process according to the prior art, where a $SO_2$ conversion step is followed by a single wet condensing stage. In the process according to the prior art comprising a $SO_2$ conversion stage and a single wet condensing stage, the feed gas to the process containing 14 vol % $SO_2$ is substantially air diluted so as to provide a 5-6 vol % $SO_2$ gas with acid dew point of 260° C. at the inlet of the final condensing stage. The process according to the invention, corresponding to FIG. 2 and Table 1, requires no substantial air dilution compared with the prior art and provides at the same time higher $SO_2$ conversion and lower acid mist emissions.

TABLE 1

|  | 21 | | 23 | | 212 | | 218 | | 221 | |
| --- | --- | --- | --- | --- | --- | --- | --- | --- | --- | --- |
|  | Nm3/h | mol % | Nm3/h | mol % | Nm3/h | mol % | Nm3/h | mol % | Nm3/h | mol % |
| SO2 | 2520 | 14.0 | 2520 | 9.1 | 89.6 | 0.36 | 89.5 | 0.42 | 1.24 | 0.0058 |
| SO3 |  |  |  |  | 951.3 | 3.82 |  |  | 22.9 | 0.11 |
| H2SO4 |  |  |  |  | 1479 | 5.9 | 81.3 | 0.38 | 146.6 | 0.69 |
| O2 | 540 | 3.0 | 2520 | 9.1 | 1305 | 5.2 | 1305 | 6.1 | 1261 | 5.9 |
| H2O | 4140 | 23.0 | 4325 | 15.7 | 2846 | 11.4 | 1693 | 7.9 | 1627 | 7.6 |
| N2 | 10800 | 60.0 | 18255 | 66.1 | 18255 | 73.2 | 18247 | 85.2 | 18247 | 85.6 |
| Total | 18000 | 100.0 | 27620 | 100.0 | 24926 | 100.0 | 21416 | 100.0 | 21306 | 100.0 |

|  | 226 | | 224 | | 214 | |
| --- | --- | --- | --- | --- | --- | --- |
|  | Nm3/h | mol % | kg/h | wt % | kg/h | wt % |
| SO2 | 1.22 | 0.0058 |  |  |  |  |
| SO3 |  |  |  |  |  |  |
| H2SO4 | 0.11 | 0.0005 | 742 | 95.5 | 11032 | 98.3 |
| O2 | 1261 | 6.0 |  |  |  |  |
| H2O | 1561 | 7.4 | 35 | 4.5 | 195 | 1.7 |
| N2 | 18247 | 86.6 |  |  |  |  |
| Total | 21070 | 100.0 | 776 | 100.0 | 11227 | 100.0 |

TABLE 2

|  | 31 | | 33 | | 312 | | 318 | | 321 | |
| --- | --- | --- | --- | --- | --- | --- | --- | --- | --- | --- |
|  | Nm3/h | mol % | Nm3/h | mol % | Nm3/h | mol % | Nm3/h | mol % | Nm3/h | mol % |
| SO2 | 2520 | 14.0 | 2520 | 9.1 | 89.6 | 0.36 | 89.6 | 0.34 | 1.14 | 0.0043 |
| SO3 |  |  |  |  | 951.3 | 3.82 |  |  | 56.3 | 0.21 |
| H2SO4 |  |  |  |  | 1479 | 5.9 | 116.4 | 0.44 | 148.6 | 0.56 |
| O2 | 540 | 3.0 | 2520 | 9.1 | 1305 | 5.2 | 2334 | 8.8 | 2289 | 8.7 |
| H2O | 4140 | 23.0 | 4325 | 15.7 | 2846 | 11.4 | 1844 | 7.0 | 1812 | 6.9 |
| N2 | 10800 | 60.0 | 18255 | 66.1 | 18255 | 73.2 | 22125 | 83.5 | 22125 | 83.7 |
| Total | 18000 | 100.0 | 27620 | 100.0 | 24926 | 100.0 | 26509 | 100.0 | 26433 | 100.0 |

|  | 326 | | 324 | | 314 | |
| --- | --- | --- | --- | --- | --- | --- |
|  | Nm3/h | mol % | kg/h | wt % | kg/h | wt % |
| SO2 | 1.12 | 0.0043 |  |  |  |  |
| SO3 |  |  |  |  |  |  |
| H2SO4 | 0.13 | 0.0005 | 896 | 96.0 | 11022 | 98.6 |
| O2 | 2289 | 8.8 |  |  |  |  |
| H2O | 1709 | 6.5 | 37 | 4.0 | 157 | 1.4 |
| N2 | 22125 | 84.7 |  |  |  |  |
| Total | 26125 | 100.0 | 933 | 100.0 | 11178 | 100.0 |

TABLE 3

|  | 41 | | 43 | | 412 | | 418 | | 421 | |
| --- | --- | --- | --- | --- | --- | --- | --- | --- | --- | --- |
|  | Nm3/h | mol % | Nm3/h | mol % | Nm3/h | mol % | Nm3/h | mol % | Nm3/h | mol % |
| SO2 | 2520 | 14.0 | 2520 | 9.1 | 89.6 | 0.36 | 89.5 | 0.38 | 1.09 | 0.0046 |
| SO3 |  |  |  |  | 951.3 | 3.82 |  |  | 24.3 | 0.10 |
| H2SO4 |  |  |  |  | 1479 | 5.9 | 83.3 | 0.35 | 147.5 | 0.62 |
| O2 | 540 | 3.0 | 2520 | 9.1 | 1305 | 5.2 | 1778 | 7.5 | 1733 | 7.3 |
| H2O | 4140 | 23.0 | 4325 | 15.7 | 2846 | 11.4 | 1780 | 7.5 | 1716 | 7.3 |
| N2 | 10800 | 60.0 | 18255 | 66.1 | 18255 | 73.2 | 20028 | 84.3 | 20028 | 85 |
| Total | 18000 | 100.0 | 27620 | 100.0 | 24926 | 100.0 | 23758 | 100.0 | 23650 | 100.0 |

|  | 426 | | 424 | | 414 | |
| --- | --- | --- | --- | --- | --- | --- |
|  | Nm3/h | mol % | kg/h | wt % | kg/h | wt % |
| SO2 | 1.08 | 0.0046 |  |  |  |  |
| SO3 |  |  |  |  |  |  |
| H2SO4 | 0.12 | 0.0005 | 751 | 95.5 | 11029 | 98.6 |
| O2 | 1733 | 7.4 |  |  |  |  |
| H2O | 1647 | 7.0 | 35 | 4.5 | 157 | 1.4 |
| N2 | 20028 | 85.6 |  |  |  |  |
| Total | 23410 | 100.0 | 786 | 100.0 | 11186 | 100.0 |

TABLE 4

|  | 51 | | 53 | | 512 | | 518 | | 522 | |
| --- | --- | --- | --- | --- | --- | --- | --- | --- | --- | --- |
|  | Nm3/h | mol % | Nm3/h | mol % | Nm3/h | mol % | Nm3/h | mol % | Nm3/h | mol % |
| SO2 | 2520 | 14.0 | 2520 | 9.1 | 89.6 | 0.36 | 89.6 | 0.42 | 1.30 | 0.0047 |
| SO3 |  |  |  |  | 951.3 | 3.82 |  |  | 51.8 | 0.19 |
| H2SO4 |  |  |  |  | 1479 | 5.9 | 94.1 | 0.44 | 301.4 | 1.09 |
| O2 | 540 | 3.0 | 2520 | 9.1 | 1305 | 5.2 | 1305 | 6.2 | 2494 | 9.0 |
| H2O | 4140 | 23.0 | 4325 | 15.7 | 2846 | 11.4 | 1462 | 6.9 | 1868 | 6.8 |
| N2 | 10800 | 60.0 | 18255 | 66.1 | 18255 | 73.2 | 18255 | 86.1 | 22896 | 82.9 |
| Total | 18000 | 100.0 | 27620 | 100.0 | 24926 | 100.0 | 21206 | 100.0 | 27612 | 100.0 |

TABLE 4-continued

|  | | 526 | | 524 | | 514 | |
| --- | --- | --- | --- | --- | --- | --- | --- |
|  | | Nm3/h | mol % | kg/h | wt % | kg/h | wt % |
| | SO2 | 1.30 | 0.0048 | | | | |
| | SO3 | | | | | | |
| | H2SO4 | 0.14 | 0.0005 | 1545 | 96.0 | 11021 | 98.6 |
| | O2 | 2494 | 9.2 | | | | |
| | H2O | 1736 | 6.4 | 64 | 4.0 | 155 | 1.4 |
| | N2 | 22896 | 84.4 | | | | |
| | Total | 27127 | 100.0 | 1609 | 100.0 | 11177 | 100.0 |

TABLE 5

|  | Prior art. Single condensing stage[1] | Invention |
| --- | --- | --- |
| Gas flow (relative) | 100 | 57 |
| SO$_2$ conversion (%) | 99.5-99.7[2] | 99.95 |
| Acid mist emission | 10-20 ppmv | ~5 ppmv |

[1]Feed gas to the process contains 14 vol % SO$_2$. The gas has been air diluted to 5-6% SO$_2$ prior to entering the SO$_2$-converter corresponding to 5-6% H$_2$SO$_4$(g) in the gas entering the single condensing stage so that its acid dew point is 260° C.
[2]Without tail gas scrubbing.

The invention claimed is:

1. Process of producing sulfuric acid from feed gases containing 0.1-30% SO$_2$ comprising the steps of:
   (a) passing the feed gas to a first catalytic conversion step in which SO$_2$ is oxidized to SO$_3$ over one or more catalyst beds,
   (b) cooling the SO$_3$-containing gas from said first contacting step by passing said gas to an intermediate condensing stage withdrawing a gas containing unconverted SO$_2$ and unabsorbed SO$_3$ and withdrawing a product stream of concentrated sulfuric acid,
   (c) reheating said gas containing unconverted SO$_2$ and unabsorbed SO$_3$,
   (d) passing the gas from step (c) to a second catalytic conversion step, in which unconverted SO$_2$ is oxidized to SO$_3$ over one or more catalyst beds,
   (e) cooling the gas from step (d) to a temperature of 0 to 100° C. above the acid dew point of said gas,
   (f) passing the gas from step (e) with a molar ratio of H$_2$O to SO$_3$ of at least 1.05 calculated under the assumption that SO$_3$ is not hydrated to H$_2$SO$_4$ and acid dew point of below about 240° C. to a final wet condensing stage, in which the remaining sulfuric acid is condensed by cooling of said gas by indirect or direct heat exchange with a cooling medium,
   (g) providing in the gas, prior to conducting step (f), a content of $10^{10}$ to $10^{13}$ solid particles per Nm$_3$ per vol % SO$_3$ calculated under the assumption that SO$_3$ is not hydrated to H$_2$SO$_4$, and
   (h) withdrawing from the final wet condensing stage of step (f) a stream of 70-98 wt % sulfuric acid.

2. Process according to claim 1, wherein the feed gas in step (a) containing SO$_2$ is a strong gas containing 6 vol % to 30 vol % SO$_2$.

3. Process according to claim 1, further comprising cooling the gas from step (a) to a temperature of 0° C. to 100° C. above the acid dew point of said gas prior to conducting step (b).

4. Process according to claim 1, further comprising providing the particles of step (g) to the gas resulting from step (e).

5. Process according to claim 1, wherein the intermediate condensing stage of step (b) is conducted in a packed sulfuric acid tower comprising a concentration and condensing zone by contacting the SO$_3$-containing gas stream with liquid sulfuric acid of strength 70-98 wt % flowing countercurrently with the SO$_3$-containing gas.

6. Process according to claim 1, further comprising returning the stream of 70-98 wt % sulfuric acid of step (h) to the intermediate condensing stage (b).

7. Process according to claim 1, wherein the intermediate condensing stage of step (b) is conducted in substantially vertical tubes in which the cooling of the SO$_3$-containing gas stream takes place by indirect heat exchange with a cooling medium, in which said cooling medium is air flowing countercurrently.

8. Process according to claim 1, wherein the cooling of the gas in the final condensing stage is conducted in substantially vertical tubes by indirect heat exchange with a cooling medium, in which said cooling medium is air flowing countercurrently.

9. Process according to claim 1, wherein the cooling of the gas in the final condensing stage is conducted in a packed sulfuric acid tower by direct heat exchange with circulating sulfuric acid.

10. Process according to claim 5 further comprising passing hot air at 400-550° C. to the concentration zone of the intermediate condensing stage and passing the SO$_3$-containing gas from the first catalytic conversion step directly to the condensing zone of said intermediate condensation stage, whereby concentrated sulfuric acid is produced by countercurrent contact with said hot air.

11. Process according to claim 5 further comprising dividing said intermediate condensing stage into at least an upper and a bottom concentrating zone and passing the SO$_3$-containing gas from the first catalytic conversion step to the upper concentration zone of the intermediate condensation stage and passing hot air at 400-550° C. to the bottom concentration zone, whereby concentrated sulfuric acid is produced by countercurrent contact with said hot air.

12. Process according to claim 10, further comprising diverting a stream of off-gas from the hot air which has been in contact with sulfuric acid in the intermediate condensation stage to the final condensing stage by combining said stream of off-gas with the cooled SO$_3$-containing gas stream withdrawn from the second catalytic conversion step of the SO$_2$ conversion stage.

* * * * *